US009218672B2

(12) United States Patent
Soum (10) Patent No.: US 9,218,672 B2
(45) Date of Patent: Dec. 22, 2015

(54) DEVICE AND METHOD FOR GENERATING PROCEDURAL IMAGES WITH A CACHE

(75) Inventor: Christophe Soum, Clermont-Ferrand (FR)

(73) Assignee: ALLEGORITHMIC SAS, Clermont-Ferrand (FR)

( * ) Notice: Subject to any disclaimer, the term of this patent is extended or adjusted under 35 U.S.C. 154(b) by 405 days.

(21) Appl. No.: 13/812,301

(22) PCT Filed: Jul. 27, 2011

(86) PCT No.: PCT/IB2011/001730
§ 371 (c)(1),
(2), (4) Date: Apr. 1, 2013

(87) PCT Pub. No.: WO2012/014045
PCT Pub. Date: Feb. 2, 2012

(65) Prior Publication Data
US 2013/0181994 A1    Jul. 18, 2013

Related U.S. Application Data
(60) Provisional application No. 61/369,803, filed on Aug. 2, 2010.

(30) Foreign Application Priority Data

Jul. 29, 2010   (FR) ..................................... 10 03201

(51) Int. Cl.
*G09G 5/00* (2006.01)
*G06T 11/20* (2006.01)
(Continued)

(52) U.S. Cl.
CPC . *G06T 11/00* (2013.01); *G06T 1/60* (2013.01); *G06T 11/001* (2013.01); *G06T 11/206* (2013.01); *G06T 15/04* (2013.01)

(58) Field of Classification Search
CPC ....... G06T 15/04; G06T 11/206; G06T 17/05; G06T 5/001; G06T 11/60; G06F 17/30958; G06F 9/546
USPC .................. 345/423, 426, 440, 440.1, 440.2, 345/441–443, 582; 382/113, 254–276, 305; 707/791–805
See application file for complete search history.

(56) References Cited

U.S. PATENT DOCUMENTS

2002/0012132 A1 *   1/2002   Herceg et al. ................ 358/1.15
2002/0080143 A1 *   6/2002   Morgan et al. ................ 345/581

OTHER PUBLICATIONS

International Search Report, mailed Feb. 10, 2012, for International Patent Application No. PCT/IB2011/001730.
Allegorithmic: "Substance: Unleashing online gaming with descriptive textures", White Paper, Mar. 2009, pp. 1-10.
Li Wang et al.: "Reuse-Aware Modulo Scheduling for Stream Processors", 2010 Design, Automation & Test in EP Conf. & Exhib, Dresen, DE, Mar. 12, 2010, p. 6.
Yoonseo Choi et al.: "Stream compilation for real-time embedded multicore systems", 2009 7th Ann. IEEE/ACM Int. Syp. on Code Gen., Piscatawy, NJ, pp. 210-220.
(Continued)

*Primary Examiner* — Phi Hoang
*Assistant Examiner* — Andrew Shin
(74) *Attorney, Agent, or Firm* — Thomas, Karceski & Karmilovich, PC (57) ABSTRACT

An image generation engine capable of generating images for a host application from procedural data includes an image generation, a sequential procedural graph traversal module, an intermediate result computation module, an intermediate result rendering time computation module, an intermediate result weight computation module, memory modules for storing the graph G and the corresponding L0, L1, L2, L3 and M lists, and a comparison and deletion module adapted to compare the memory space available for storing new intermediate result data or previously existing data with a given minimum threshold and delete intermediate result data if said memory space available for storing new intermediate result data is below the threshold.

12 Claims, 8 Drawing Sheets

(51) Int. Cl.
  *G06K 9/00* (2006.01)
  *G06K 9/40* (2006.01)
  *G06K 9/36* (2006.01)
  *G06F 7/00* (2006.01)
  *G06T 11/00* (2006.01)
  *G06T 15/04* (2011.01)
  *G06T 1/60* (2006.01)

(56) References Cited

OTHER PUBLICATIONS

Buck I et al. "Brook for GPUs: Stream Computing on Graphics Hardware", ACM Transactions on Graphics: TOG, ACM, US, Aug. 8, 2004, pp. 777-786.

* cited by examiner

DEVICE AND METHOD FOR GENERATING PROCEDURAL IMAGES WITH A CACHE

CROSS-REFERENCE TO RELATED APPLICATION(S)

This is a National Stage Entry into the United States Patent and Trademark Office from International PCT Patent Application No. PCT/IB2011/001730, having an international filing date of 27 Jul. 2011, which claims priority to French Patent Application No. 1003201, filed 29 Jul. 2010, and U.S. Patent Application No. 61/369,803, filed 2 Aug. 2010, the contents of all of which are incorporated herein by reference.

FIELD OF THE INVENTION

The present invention relates to an image generation engine capable of generating images for a host application from procedural data in the form of sequential graphs having simple nodes, intermediate result nodes and final result nodes. It also relates to a corresponding image generation method.

DESCRIPTION OF THE RELATED ART

Many graphics applications need to handle significant amounts of data leading to the use of significant memory space and whose handling requires a large number of complex computations. In addition, certain types of interactive graphical applications must minimize their response time as much as possible to provide satisfactory user experience: video games, training simulators, video editing or compositing software. These applications devote a significant proportion of resources to the handling of images known as "textures", which for instance represent the surface appearance of an object, background scenery, or composition masks. The textures are used to store not only color information, but also any other parameter useful to the application. In a video game, textures typically store colors, small surface features, as well as the reflection coefficients of materials.

Editing, storing and displaying these textures are key issues for graphics applications. Generally, the textures are painted by graphics designers, and are sometimes based on photographs. Once painted, the texture has a frozen resolution and it is very difficult to adapt it to another context. As applications increasingly use textures, it becomes very expensive to hand paint a sufficient quantity of different textures and it is not uncommon to see repetition on the screen. Furthermore, textures are stored as arrays of pixels (color dots), which will hereinafter be referred to as "bitmaps". Even after it has been compressed, such information is very costly to store on a mass medium such as a DVD or a hard disk, and very slow to transfer over a network.

Of course, techniques have been proposed to meet these challenges, in particular the concept of a "procedural texture". According to this concept the image results from a computation rather than from hand painting. Under certain conditions, the computation of the image can be made at the last moment, just before it is displayed, thus reducing the need to store the entire image. It is also easy to introduce changes in procedural textures, thus avoiding repetition. However, procedural textures cannot be easily created and manipulated by graphics designers, and their use remains restricted to a small number of specific types of material. Despite numerous attempts, no system has been able to provide a comprehensive tool for efficiently editing, manipulating and displaying procedural textures.

To overcome these drawbacks, the invention provides various technical means.

SUMMARY OF THE INVENTION

A first object of the invention is to provide a device for optimizing the generation of images and/or textures.

Another object of the invention is to provide a method for optimizing the generation of images and/or textures.

Yet another object of the invention is to provide a method for reusing and/or retaining portions of computations to generate several series of procedural images or textures.

Yet another object of the invention is to provide a texture rendering method for operation in real time applications.

To this end, the invention provides an image generation engine capable of generating images for a host application from procedural data in the form of sequential graphs having simple nodes, intermediate result nodes and final result nodes, comprising:
  at least one microprocessor;
  a list of instructions;
  an image generation, sequential procedural graph traversal module, adapted to receive at least one image generation, sequential procedural graph G from a host application and to traverse this graph and at least one rendering list L0 containing the still outstanding image generation requests;
  an intermediate result computation module, for computing intermediate results corresponding to nodes of the image generation, sequential procedural graph;
  an intermediate result rendering time computation module;
  an intermediate result weight computation module;
  a memory module for storing the image generation, sequential procedural graph G;
  a memory module for storing a rendering list LO containing still outstanding image generation requests received from a host application;
  a memory module for storing a list L1 of intermediate results;
  a memory module for storing a list L2 of rendering times of the intermediate results;
  a memory module for storing a list L3 of weights of the intermediate results;
  a memory module for storing a list M of intermediate result images;
  A comparison and deletion module adapted to compare the memory space available for storing new intermediate result data or previously existing data with a given minimum threshold, and delete intermediate result data if said memory space available for storing new intermediate result data is below said threshold.

With this type of device, the rate of image generation or rendering is greatly increased, thereby allowing certain types of editing to be performed in real time, continuously or with short interruptions.

The preserved intermediate results are used for all subsequent computations of result textures for which these intermediate results are applicable. The results which are not kept are recomputed when necessary.

In an advantageous embodiment, the graph is in list form with indications of prerequisite intermediate results at a given step.

The invention also provides a image generation method for an image generation engine capable of generating images from procedural data in the form of sequential graphs comprising simple nodes, intermediate result nodes, and final result nodes, wherein the image generation engine:

a) receives at least one image generation sequential procedural graph G from a host application and at least one rendering list L0 containing the still outstanding requests for generating images;

b)—sets up a list L1 of intermediate results for storage in an intermediate result list module;

c)—sets up a list L2 of intermediate result rendering times for storage in an intermediate result rendering time list module;

d)—sets up a list L3 of intermediate result weights for storage in an intermediate result weight list module;

e)—sets up a list M of intermediate result images for storage in an intermediate result image module;

and wherein, after a new intermediate result has been obtained, a comparison and deletion module, when storing the corresponding items would result in the available memory space being exceeded:

f)—performs the identification of the intermediate result having the smallest weight;

g)—performs the deletion of data corresponding to the identified intermediate result having the smallest weight;

h)—checks the available memory space;

i)—if the available memory space is greater than a given minimum threshold, the comparison and deletion module ceases to delete data;

j)—if the available memory space is still below the given minimum threshold, the comparison and deletion module continues to step "f" of the method, until the available memory space is below said threshold.

The solution proposed according to the present invention is based on the fact that graphics designers describe textures using a dedicated tool which provides a strong control over the final appearance of images. This tool promotes the reuse of existing image chunks and can generate an infinite number of variations of a basic texture. The tool does not store the final image, but rather a description of the image, that is, the successive steps which allow it to be computed. In the vast majority of cases, this description is much smaller in size than the "bitmap" image. In addition, the technology according to the invention has been designed to allow very efficient generation of "bitmap" images based on their descriptions. The descriptions derived from the editor are prepared in order to be generated at runtime. Applications need only to know these reworked descriptions. When the host application intends to use a texture, it requests the generation component, known as the "engine", to convert the reworked description into a "bitmap" image. The "bitmap" image is then used as a conventional image.

Thus, the technology of the invention resorts to the generation of images in the form of graphs. Each node in the graph applies an operation to one or more input images (blur, distortion, color change, etc.). Each node also has parameters that can be manipulated by the user or specified through arithmetic operations from other parameters. Certain nodes generate images directly from the parameters without requesting any other input image. The graphics designer describes a result image by means of this graph, via a dedicated software tool.

In an advantageous embodiment, a modification of the rendering list L0 leads to a recomputation of the weights of the intermediate results.

In one advantageous variant, the intermediate result weight computation module sorts weights in order of increasing weight. This mode is useful in the case where the intermediate result is preserved if the weight has a large value.

The intermediate result newly obtained before the data deletion step is preferably taken into account in the step of identifying the intermediate result having the smallest weight.

According to another advantageous embodiment, the intermediate result computation module determines the intermediate results according to the rendering list L0.

According to various alternative embodiments, the weight computation module performs the weight computations by considering the size occupied by the result image in memory, and/or the volume of computations required to compute said intermediate result and/or temporal distance before reusing said intermediate result.

According to yet other alternative embodiments, in the step of deleting the data corresponding to the intermediate result, the image generation engine performs the deletion of the image data of the intermediate result, and/or of the data in lists L1, L2 and L3.

According to yet another advantageous alternative, a modification of the minimum threshold level of available memory leads to a new weight computation.

DESCRIPTION OF FIGURES

All implementation details are given in the following description, with reference to FIGS. 1 to 12, presented solely for the purpose of non-limiting examples and in which.

DETAILED DESCRIPTION OF THE INVENTION

Figure 1:
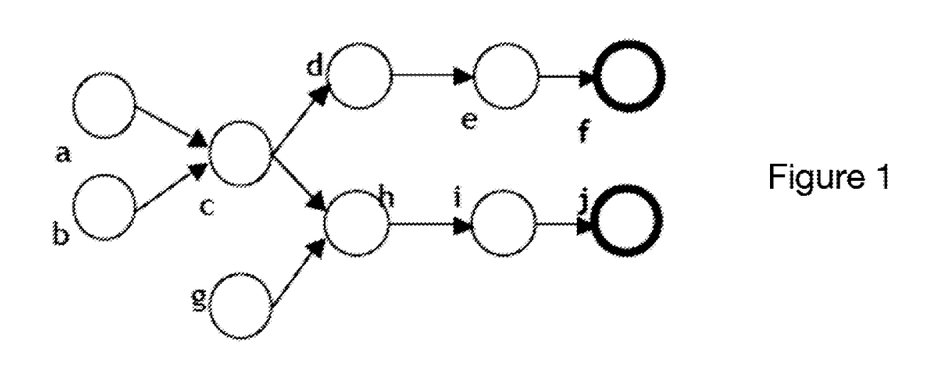
FIGS. 1 to 6 and FIG. 8 are schematic illustrations of image generation graph examples according to the invention.

An example of a generation graph is shown in FIG. 1. Nodes [a, b, c, d, e, g, h, i] generate intermediate results while nodes [f, j] are the computations generating the image results desired by the user. To obtain the result images, all other nodes must be traversed in the order defined by the orientation of the edges of the graph. Since a node can not be computed until all its inputs are available, two independent sub-branches can be evaluated in parallel but must be synchronized when they join a node.

Each computation is performed in a time of its own, depending on its complexity and the amount of data to be processed. Each node generates an image that requires a certain amount of memory for said image to be saved. This amount of memory is dependent on the size of the image and is specific to each node. For example, for a given node, processing an image B twice as high and wide as an image A will result in four times as much data to be processed and therefore, potentially, four times as much execution time and four times as much memory space to store the result.

To perform the computation of a node images used as input must be available in memory. For example, suppose that the graph in FIG. 1 is evaluated in sequence, node after node, in the order shown in FIG. 2.

Figure 2:
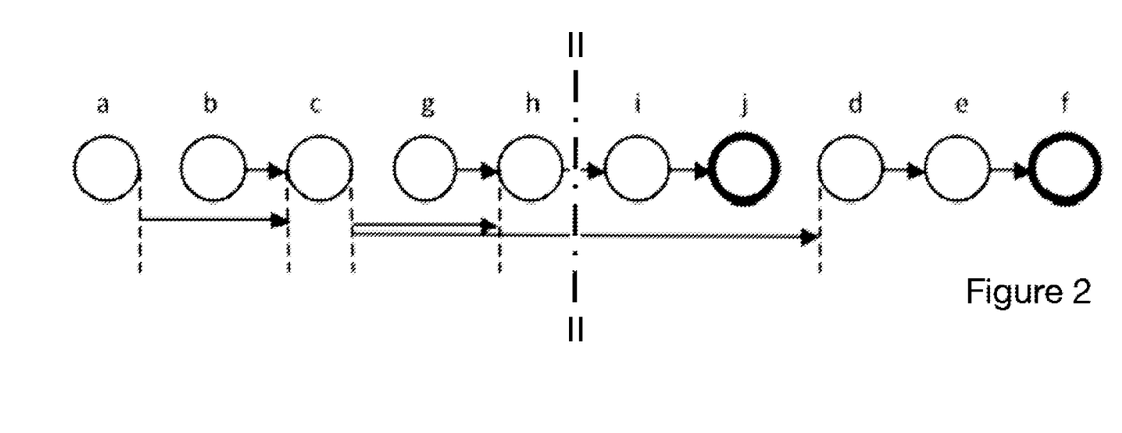

Nodes are computed from left to right. The arrows indicate the intermediate results that must be stored. The dotted line indicates a particular computation step. In this step the intermediate results of nodes [h] and [c] are stored in memory. These results will indeed be used by nodes [i] and [d], respectively, which will be evaluated subsequently. This means that they will be useful later in the same computation sequence, or in a subsequent computation sequence (in this example, it is possible to consider computing image [j] alone, then image [f] in a second step).

Figure 3:
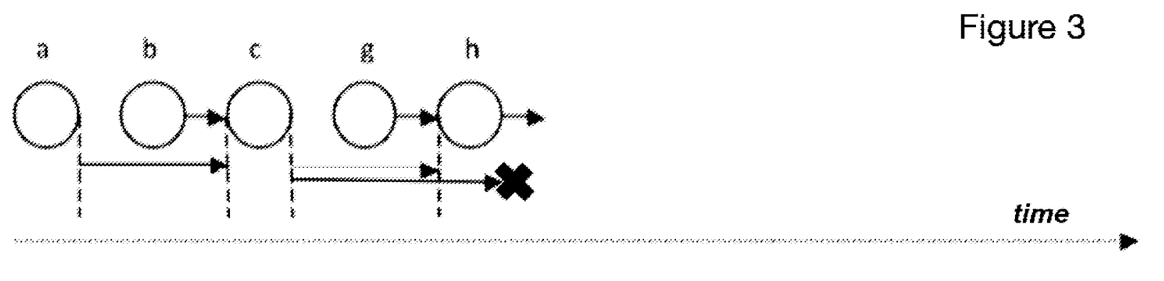

It is therefore necessary to keep a set of intermediate results in memory. The number of intermediate images to be stored depends on the complexity of the graph. However, since memory is a finite resource, it often happens that the host application only allocates a limited amount of memory to the procedural image rendering engine. Therefore it will sometimes be necessary to delete one (or more) intermediate result(s) in order to meet the "memory budget" imposed on the rendering engine by the host application. In this case, if a deleted intermediate result is again used later in the generation process, it will be necessary to regenerate it from the intermediate results kept in memory, or if applicable, from the beginning of the graph branch leading to this result. Thus, for the example of FIG. 2, suppose that the available memory does not allow the intermediate results of nodes [c] and [h] to be stored simultaneously. When computing node [h], the result of node [c] will then have to be deleted, as shown in FIG. 3.

Figure 4:
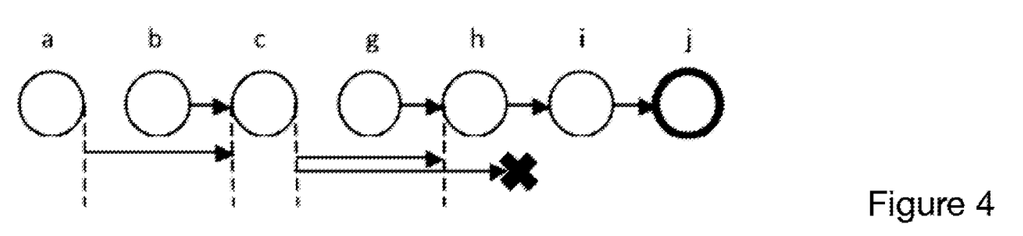
Figure 5:
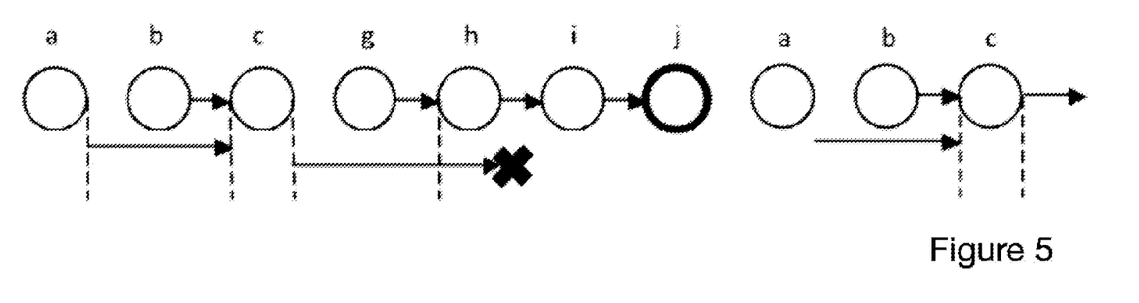
Figure 6:
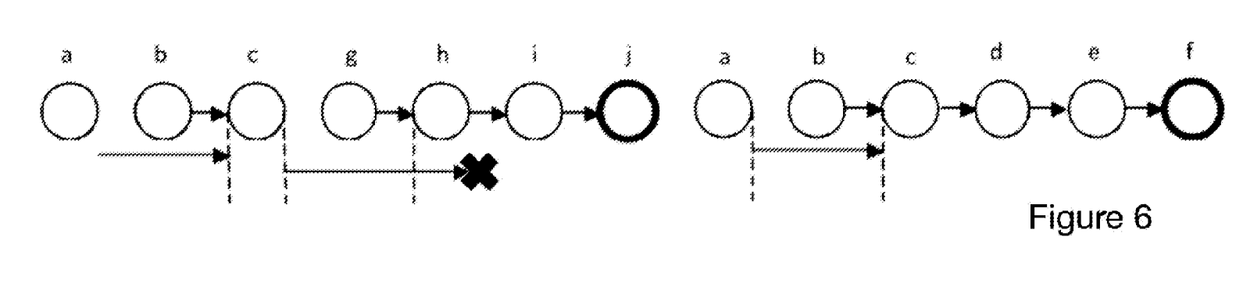

In FIG. 4, it can be seen that the generation then continues up to node [j], the result of [c] being unnecessary for these nodes. In FIG. 5, where [c] is needed again (when reaching node [d]), the algorithm regenerates it from the beginning of the graph. The generation then ends (FIG. 6). At no stage were intermediate results [c] and [h] simultaneously present in memory, thus reducing the required space. In exchange, nodes [a, b, c] have been computed twice. Depending on the memory budget imposed by the host application, it is thus possible to find a tradeoff between the amount of occupied memory and the computation time required to generate all of the outputs of the graph. It is therefore crucial to correctly choose which results will be stored in memory or deleted, in order to maximize memory usage within the budget established without too often having to repeat previously made computations. However, a major difficulty lies in the fact that the order of operations is not always known in advance. Indeed, for the graph in FIG. 1, the host application may first request the generation of image [f], followed by the generation of image [j], or conversely, it may first request the generation of result [j], followed by the generation of [f]. Defining an optimal choice is rarely possible. In addition, as mentioned above, this problem exists both in the generation of a graph—as described above—but also temporally, when images are generated one after the other, at the user's request. This problem, known as "streaming", is described in more detail hereinafter.

The technology of the present invention allows the result images to be "streamed" when they are used as textures (images applied to geometry) in a graphics application. "Streaming" allows textures to be generated only when they become visible on screen, depending on the user's movements. Textures that are not visible are deleted from memory to free up space. This limits memory consumption only to textures needed to display the current viewpoint.

Typically, the display engine maintains a set of textures needed to display the current viewpoint, and causes this set to change according to the user's movements, by adding to these textures that were previously invisible and have become visible or conversely by removing textures previously visible and that have become invisible. The rendering engine can also anticipate these changes based on the user's movements to ensure that all relevant textures are present in memory before being visible, so that not too many images must be loaded within a limited period of time, which would result in a significant slowdown of the application. The display engine typically sends three types of event:

a texture is likely to become visible within T time units;
a texture becomes visible immediately (T=0);
a texture is no longer visible.

Events of the first type allow loads having a priority which is dependent on T to be anticipated: Requests for loading textures are thus stored in a render list ordered according to the time T beyond which each texture must absolutely be available.

"Streaming" is a widely accepted technology for loading textures stored as conventional bitmaps. However, the procedural texture technology has some special features which can be exploited to optimize the generation of textures during "streaming": it is possible to keep the intermediate results (images) internal to the graph and common to several result images. This avoids these having to be recomputed and allows the generation to be accelerated. This problem is the same as that mentioned above for a complete graph: the goal is to keep as many intermediate results as possible in memory whilst minimizing redundant computations.

Due to the characteristics of the procedural image computing process via graph generation, it is possible to store intermediate results common to multiple result images for faster generation. One aspect of the solution is to keep as many results as possible within the allocated memory budget and to decide which candidate is best for deletion only when necessary.

Figure 7:
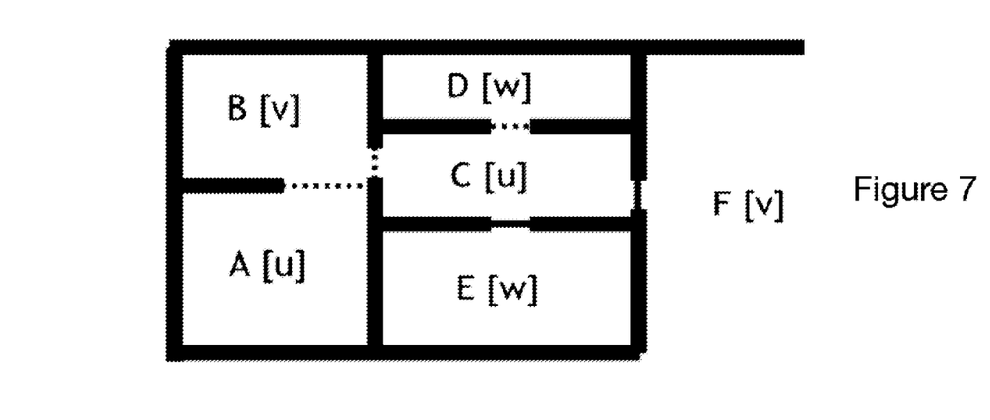
FIGS. 7 and 9 schematically illustrate a scene in which images are generated for a host application.
Figure 8:
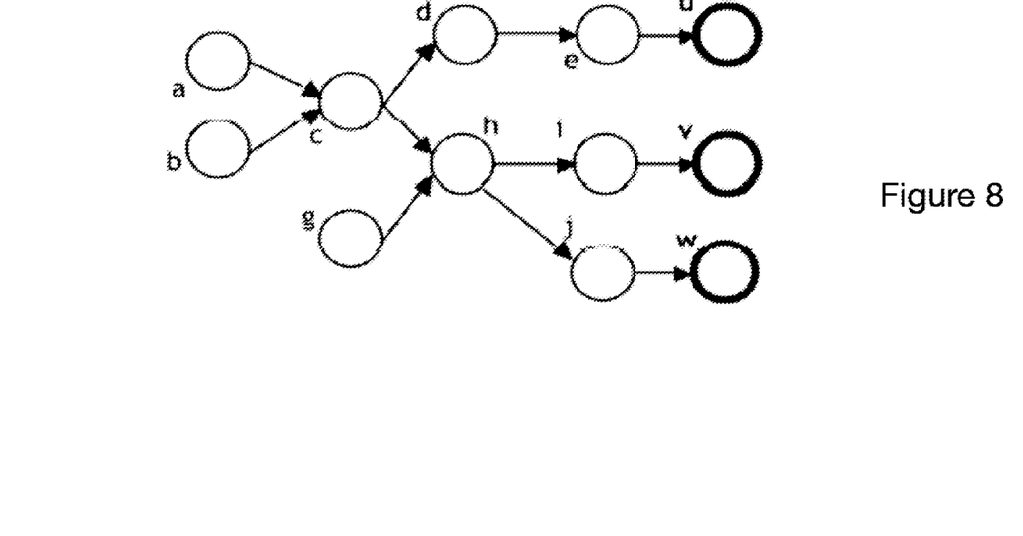

For example, consider the scene in FIG. 7 when cut into pieces (cells). Each piece uses a subset of three different textures (result images) denoted [u, v, w]. The generation graph is shown in FIG. 8. The order in which textures are generated will in this case be determined by the user's movement in the scene, that is to say, the order in which the textures need to appear, to display the successive viewpoints. In general, this order is not known in advance.

Figure 9:
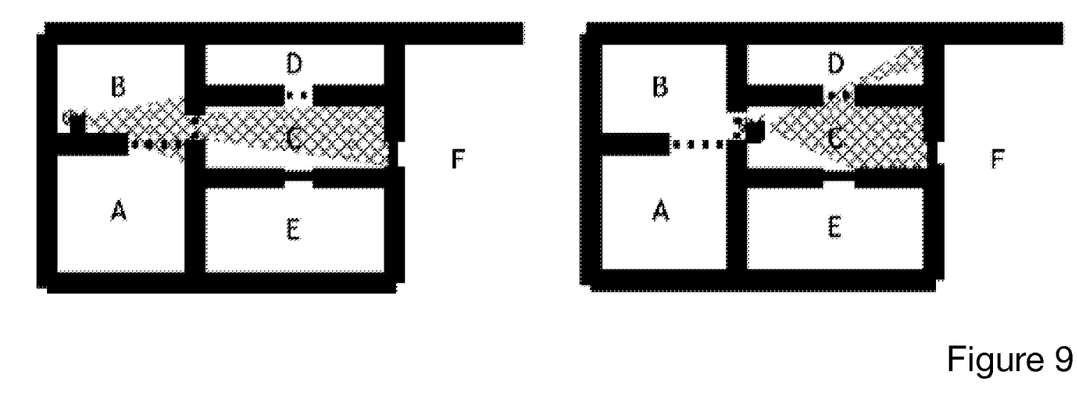

As has been described above, it is possible to keep in memory the result of nodes used several times in the same computation. For example, for the viewpoint shown in FIG. 9 on the left, pieces A, B and C are visible. Textures [u, v] have been computed, as well as the intermediate results [a, b, c, d, e, g, h, i]. The second viewpoint of FIG. 9 (right) requires pieces C and D and therefore textures [u, w]. Texture [w] can be computed very rapidly from the only intermediate result [h], which has been computed at the preceding viewpoint. It is thus apparent that [h] is an excellent intermediate result to be kept in memory, since it allows both [v] and [w] to be computed rapidly. Similarly, [c] is involved in the computation of the three result textures, and it is likely that it is desirable to keep it in memory.

This reveals the main difficulty experienced when keeping intermediate results: it is required to determine which results should be kept, and this, of course, according to the available working memory. By default, all intermediate results are kept, and the deletion of the less interesting results occurs only when the memory budget is exceeded.

The memory budget can be constant or dynamic (i.e. updated as required by the host application). Thus, whenever an intermediate result is deemed useful for further computations, the generator must evaluate, with respect to the memory budget, whether it is possible to keep this result. More generally, this type of problem will be recurrent throughout the lifetime of the intermediate result: in the case where another interesting intermediate result must be kept "in place", or in the case of a reduction in the memory budget set by the host application.

Figure 10:
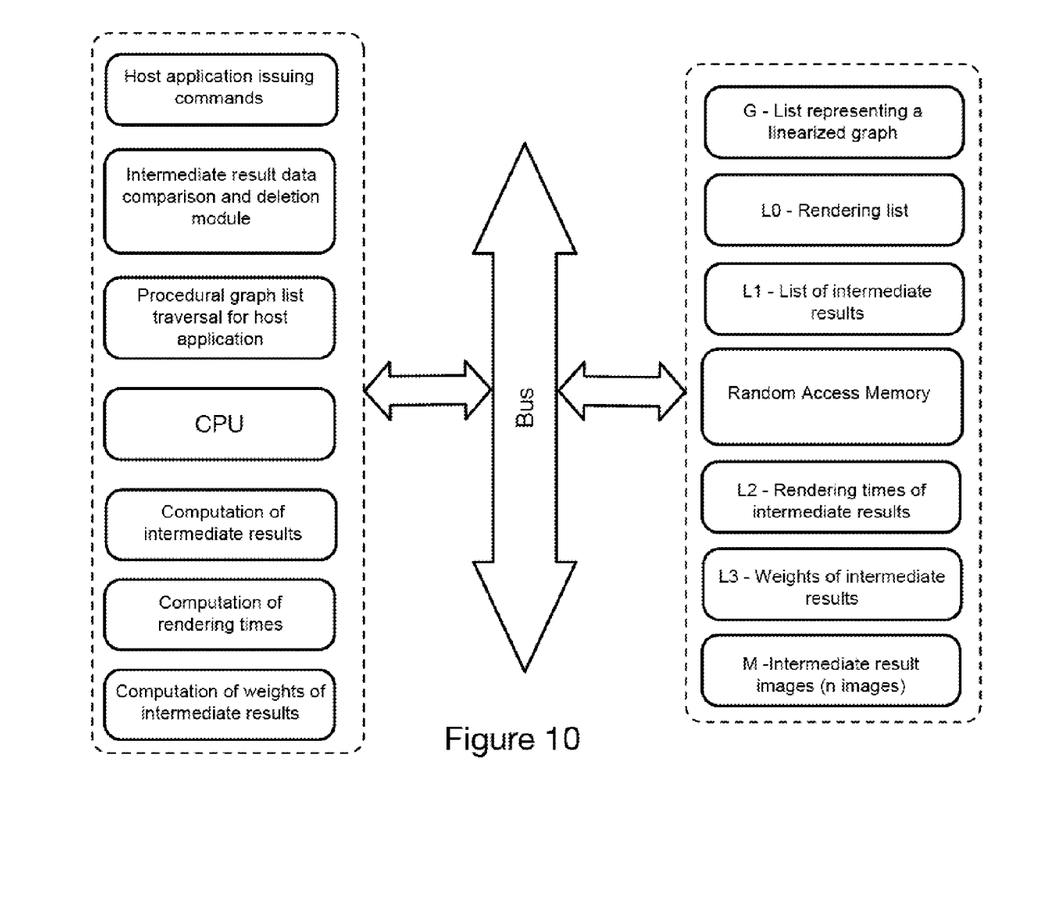
FIG. 10 shows a schematic rendering engine according to the invention.

An example device implementing the present invention is illustrated schematically in FIG. 10. This device consists of the following parts:

- a computation unit (CPU), in charge of graph traversal and execution, memory budget management, determination of the intermediate results to be deleted when the budget memory is exceeded;
- a random access memory containing the following information:
  a. an area G containing the linearized graph, as shown in FIG. 2;
  b. an area L0 containing the list of renderings in the queue to be executed later;
  c. an area L1 containing the list of intermediate results;
  d. an area L2 containing a list of rendering times associated with the intermediate results already computed;
  e. an area L3 containing the list of weights associated with the intermediate results kept in memory at a given time (see below);
  f. an area M containing the intermediate results themselves, stored in the form of tables listing the value (brightness or color) of each pixel.

The CPU is connected to the memory via a bus and can freely read from, and write to it. Moreover, the CPU must be capable of measuring the elapsed time between two events, either by means of internal registers or an external device (not shown in FIG. 10). During graph traversal, the time consumed by the execution of each node is stored in list L2.

As indicated above, all intermediate results are kept by default, and it is only when the allocated budget is exceeded that the problem of determining which results should be kept or deleted arises. The proposed invention defines a strategy for choosing the intermediate results to be deleted, so as to minimize the time required to perform any subsequent generation of result images from the same graph.

The image generation engine continuously maintains a list of intermediate results kept in memory, as well as a rendering list containing requests sent by the host application which are still outstanding. The method according to the present invention allows a composite metric (referred to as a "weight" in the following) to be associated with each intermediate result, which will indicate the potential value of keeping this intermediate result in such a way as as to reduce the time for generating the subsequent images. Once each intermediate result has been given a weight, the list of intermediate results is sorted by order of weight in order to remove the least relevant results. The measure of the relative relevance of two intermediate results is given by the comparison of their weights.

In particular, when the memory budget is to be exceeded, nodes are deleted by order of weight until the total memory usage of the intermediate results is within the imposed memory budget.

The choice of the method for computing the weight of each intermediate result determines the memory manager's behavior, as well as the order in which the intermediate results are sorted and deleted. In all cases, it is important to take the following criteria into account:

- the size taken up by the result image in memory;
- the amount of computing needed to compute this result, which represents the "cost" associated with the generation of this result;
- the temporal distance before reusing the intermediate result, as measured by the position of the first occurrence of the intermediate result being evaluated in the rendering list.

The weight of each intermediate result can therefore be computed at any time with a formula incorporating these three data items. An example of such a formula is given below:

$$f(t, e, r) = \frac{e}{k_0 t + k_1 r}$$

The variables used are:
- t, the size of the result image, in bytes;
- e, the time necessary to recompute this result, measured in milliseconds;
- r, the index of the first occurrence of the intermediate result in the rendering list (+∞ if the intermediate result is not used). Constants $k_0$ and $k_1$ are determined empirically and set to $$k_0 = \frac{1}{1024}$$

and $k_1=2$. It is important to note that parameter r depends on the rendering list, and should be reevaluated if the rendering list has changed since the original weight was computed. The proposed formula satisfies the constraints a weight metric must fulfill within the context of the present invention: the longer the time to compute an intermediate result the higher its weight, which means that it is to be preferred over an intermediate result which can be recomputed more quickly, for equal occupied memory space and reuse timings. The higher the memory space taken up by an intermediate result, the lower its weight, which means that in case the memory budget is exceeded, deleting this intermediate result is more advantageous than deleting a result having a smaller weight, for equal computation times and reuse timings. The later an intermediate result is used, the smaller its weight, which means that in case the memory budget is exceeded, it is less important to keep this result than another one which would be reused earlier in the rendering list, for equal computation times and occupied memory spaces.

Figure 11:
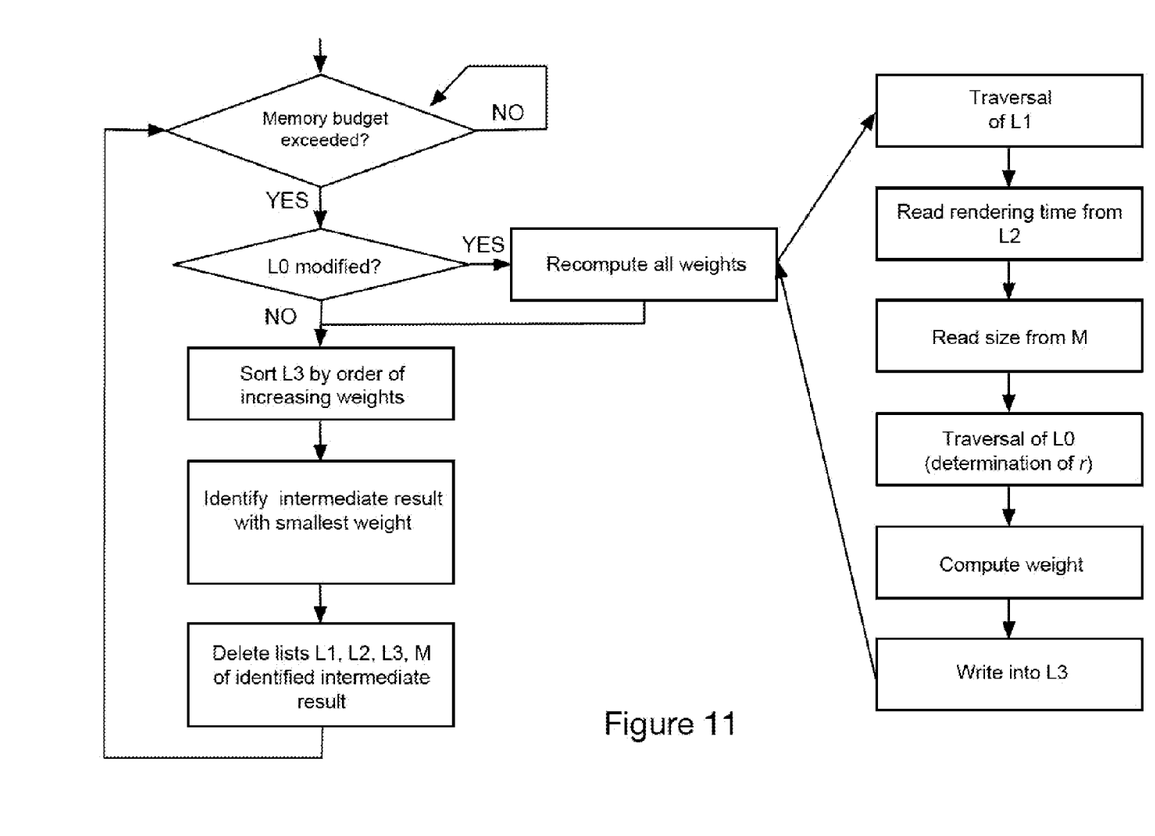
FIGS. 11 and 12 are flowcharts showing certain functional key steps of the image generation method according to the invention.

This formula combines a large weight with intermediate results which it is highly advantageous to keep in memory. Sorting the weight list and deleting the intermediate results are therefore performed by order of increasing weights. It is quite possible to consider other formulas for the weight, which combine small weights with the most advantageous intermediate results. In this case, sorting the list and deleting the intermediate results are obviously carried out by order of decreasing weights. The method associated with such a system is shown in FIG. 11.

Figure 12:
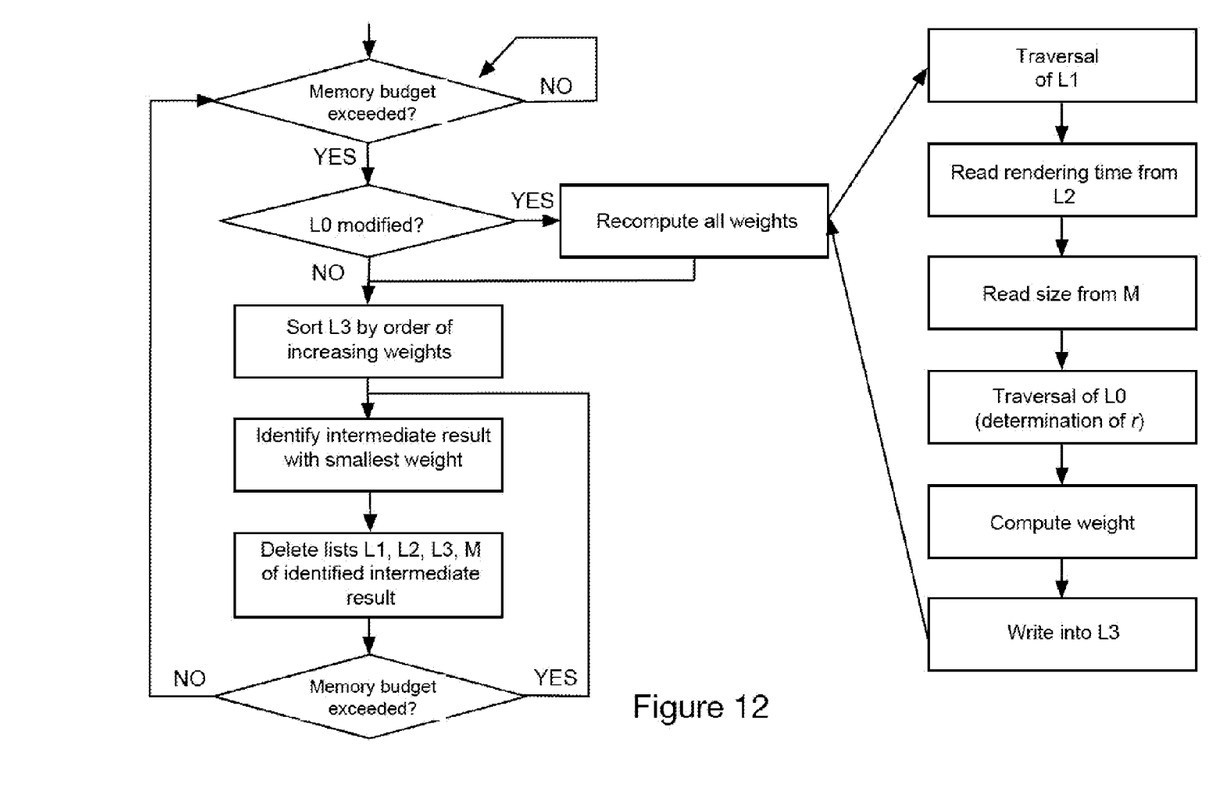

It is possible to consider a process for deleting the intermediate results which does not loop back to the first step of the illustrated process, and simply deletes the first item in the sorted list L3 for as long as the sum of the occupied memory spaces of nodes remaining in L3 is greater than the imposed memory budget. Thus, the weights are not recomputed each time an intermediate result is deleted. This introduces uncertainty on the weights of the intermediate results but reduces the overall time taken by the step of identifying and deleting the intermediate results in case the memory budget is exceeded. Such an optimization is illustrated in FIG. 12.

Implementation of the various modules described above (e.g. the comparison and deletion, traversal, intermediate result computation, rendering time computation, weight computation, modules, etc.) is advantageously carried out by means of implementation instructions, allowing the modules to perform the operation(s) specifically intended for the particular module. Instructions can be in the form of one or more pieces of software or software modules implemented by one or more microprocessors. The module and/or software is/are advantageously provided in a computer program product comprising a recording medium usable by a computer and comprising a computer readable program code integrated into said medium, allowing application software to run it on a computer or another device comprising a microprocessor.

The invention claimed is:

1. An image generation method for an image generation engine capable of generating images from procedural data in the form of sequential graphs having simple nodes, intermediate result nodes and final result nodes, wherein the image generation engine:
   a) receives at least one image generation, sequential procedural graph G from a host application and at least one rendering list L0 containing the still outstanding requests for generating images;
   b) sets up a list L1 of intermediate results for storage in an intermediate result list module;
   c) sets up a list L2 of intermediate result rendering times for storage in an intermediate result rendering time list module;
   d) sets up a list L3 of intermediate result weights for storage in an intermediate result weight module;
   e) sets up a list M of intermediate result images for storage in an intermediate result image module;
   and wherein when, after a new intermediate result has been obtained, storing corresponding items that would result in the available memory space being exceeded, a comparison and deletion module:
   f) performs an identification of the intermediate result having the smallest weight;
   g) performs deletion of data corresponding to the identified intermediate result having the smallest weight;
   h) checks the available memory space;
   i) if the available memory space is greater than a given minimum threshold, the comparison and deletion module ceases to delete the data; and
   j) if the available memory space is still below the given minimum threshold, the comparison and deletion module continues to step "f" of the method, until the available memory space is below said threshold.

2. The image generation method according to claim 1, wherein the graph is in list form with indications of prerequisite intermediate results at a given step.

3. The image generation method according to claim 2, wherein a modification of the rendering list L0 leads to a recomputation of the weights of the intermediate results.

4. The image generation method according to claim 2, wherein the intermediate result weight computation module sorts weights in order of increasing weight.

5. The image generation method according to claim 2, wherein the intermediate result newly obtained before the data deletion step is taken into account in the step of identifying the intermediate result having the smallest weight.

6. The image generation method according to claim 2, wherein the intermediate result computation module determines the intermediate results according to the rendering list L0.

7. The image generation method according to claim 2, wherein the weight computation module performs the weight computations by considering the size occupied by the result image in memory.

8. The image generation method according to claim 2, wherein the weight computation module performs the weight computations by considering the amount of computations required to compute said intermediate result.

9. The image generation method according to claim 2, wherein the weight computation module performs the weight computations by considering temporal distance before reusing said intermediate result.

10. The image generation method according to claim 2, wherein, in the step of deleting the data corresponding to the intermediate result, the image generation engine performs the deletion of the image data of the intermediate result.

11. The image generation method according to claim 2, wherein, in the step of deleting the data corresponding to the intermediate result, the image generation engine performs the deletion of the data in lists L1, L2 and L3.

12. The image generation method according to claim 2, wherein a modification of the minimum threshold level of available memory leads to a new weight computation.

* * * * *